US005180181A

United States Patent [19]

Letechipia

[11] Patent Number: 5,180,181

[45] Date of Patent: Jan. 19, 1993

[54] MOTORIZED MOVABLE STORAGE BAG FOR USE ON A WHEELCHAIR

[75] Inventor: Jorge Letechipia, Allentown, Pa.

[73] Assignee: The Good Shepherd Rehabilitation Hospital, Allentown, Pa.

[21] Appl. No.: 783,366

[22] Filed: Oct. 28, 1991

[51] Int. Cl.[5] ............................................ B62K 15/00

[52] U.S. Cl. ................................ 280/304.1; 297/191; 297/DIG. 4; 248/289.1; 224/282

[58] Field of Search .......................... 280/304.1, 250.1; 297/191, 194, DIG.4; 248/145, 230, 287.1; 224/282, 273, 275, 42.44, 42.45 R

[56] References Cited

U.S. PATENT DOCUMENTS

| | | | |
|---|---|---|---|
| 4,289,156 | 9/1981 | Ulics | 135/66 |
| 4,577,903 | 3/1986 | Wells | 224/42.45 R |
| 4,580,803 | 4/1986 | Davis | 280/304.1 |
| 4,795,182 | 1/1989 | Dyess et al. | 280/304.1 |
| 4,913,393 | 4/1990 | Wood | 297/194 X |
| 4,919,443 | 4/1990 | Kehler | 280/304.1 |

OTHER PUBLICATIONS

Maddack, Inc. Catalog, 1987.

*Primary Examiner*—Margaret A. Focarino
*Assistant Examiner*—Kevin Hurley
*Attorney, Agent, or Firm*—Eckert Seamans Cherin & Mellott

[57] ABSTRACT

A storage bag attachable to a wheelchair is pivotable from a stored position against the back of a wheelchair backrest to an accessible position adjacent a wheelchair armrest. Pivoting is accomplished under power of an electric motor which rotates an L-shaped bar supporting the storage bag or similar receptacle. The motor can be reversible for powering the bag in both directions between its stored position and its accessible position, or a return spring or gravity return can operate in the return direction. A manual switch controls the driving motor and is preferably mounted on the wheelchair armrest. Electrical energy for powering the motor can be derived from an auxiliary battery mounted on the wheelchair frame.

26 Claims, 3 Drawing Sheets

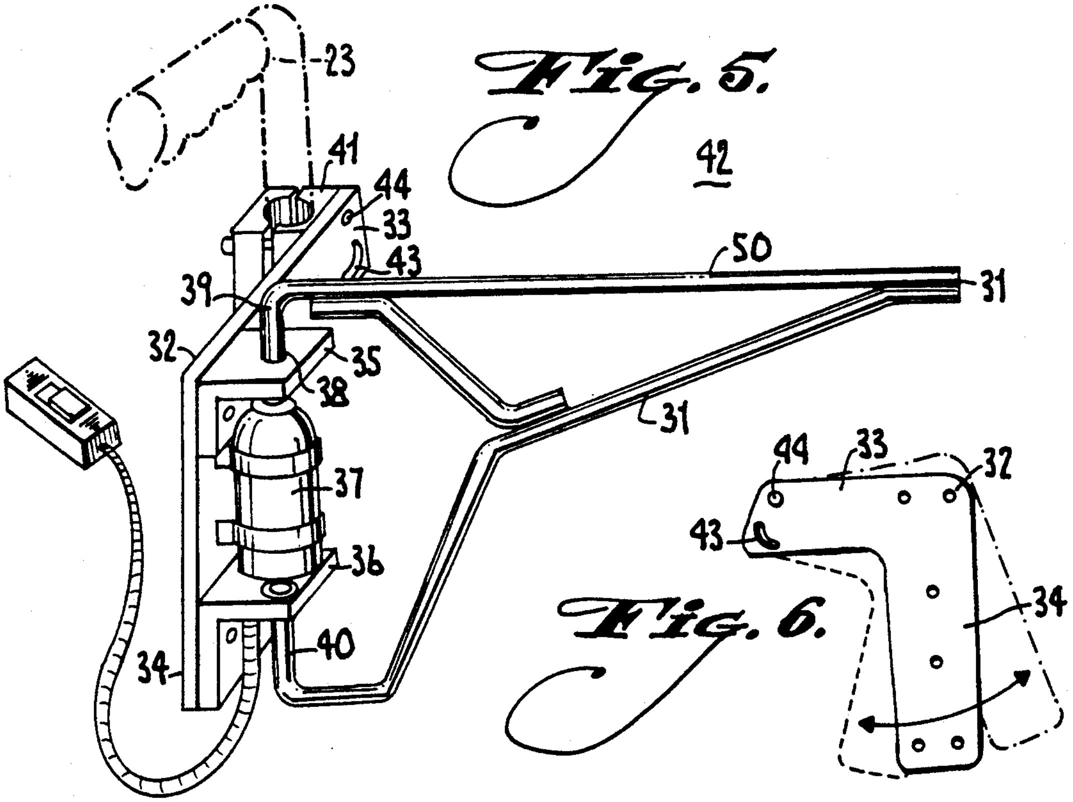
Fig. 5.
Fig. 6.
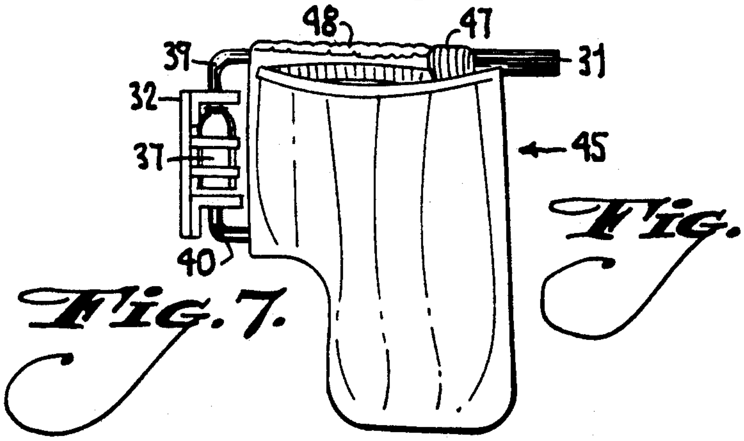
Fig. 7.
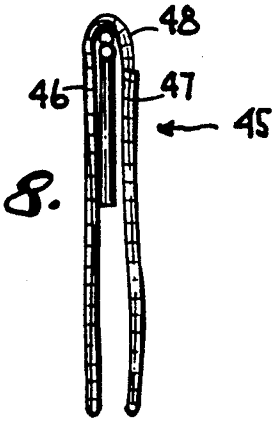
Fig. 8.
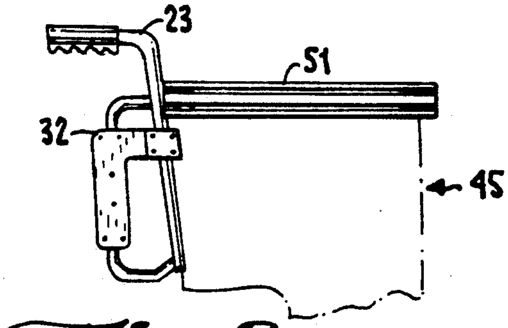
Fig. 9.
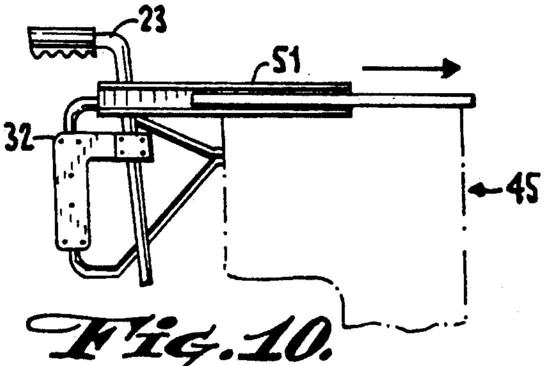
Fig. 10.

MOTORIZED MOVABLE STORAGE BAG FOR USE ON A WHEELCHAIR

BACKGROUND OF TH EINVENTION

1. Field of the Invention

This invention relates to a storage receptacle for use on a personal transportation device for a handicapped person such as, for example, a wheelchair or scooter, for storing personal items and the like for the convenience of a wheelchair or scooter-bound person. The invention specifically relates to a storage bag for use on a transportation device which is drivable under power from a stowed position behind the transportation device backrest to an accessible position alongside the transportation device.

2. Prior Art

The prior art contains a number of examples of receptacles for use by wheelchair-bound persons. Known receptacles for use by wheelchair occupants include bags, bins, boxes, trays and other forms, either mounted in a stationary manner on the wheelchair or arranged to be moved manually from one position to another. The receptacle can be, for example, a tray or basket to hold tools or files, which is moved in front of the wheelchair occupant for use, and stowed alongside the wheelchair or under the seat when not in use. Alternatively, the receptacle can include a bin or bag for general purpose storage, which is moved into its more accessible position for access, and then is stowed out of the way.

The receptacle can be mounted simply, for example via cloth loops which hang the receptacle from the handgrips at the top of the seat back. Alternatively, a movable support mechanism can be provided whereby the receptacle is guided and supported along a predetermined path between the accessible and stowed positions. A structure for guiding and supporting the receptacle relieves the user of certain physical requirements but nevertheless requires that the receptacle be grasped and pulled or pushed between its two (or more) accessible and stowed positions.

Although some wheelchair or scooter occupants have relatively complete arm and upper body function, many other wheelchair or scooter-bound persons are handicapped in a manner which makes it difficult or impossible to grasp and to move a storage receptacle manually between its more and less accessible positions. If the occupant is unable to reposition the storage device manually, the assistance of another person is required. Reliance on another person for the simple act of accessing one's personal items in a storage bag or the like is not only inconvenient for the wheelchair or scooter occupant and for the person relied upon, but contributes to feelings of dependence which can be psychologically harmful to the occupant as well as frustrating to the assistant.

Storage bags, boxes and other receptacles which are permanently affixed in usefully accessible positions are not fully satisfactory. Normally a bag or the like behind the seat back are too inaccessible to be of genuine use to the occupant. Accessible positions on a wheelchair or scooter therefore include positions alongside the wheelchair or scooter and in front of the wheelchair or scooter. Storage devices permanently mounted along the side of the wheelchair or scooter typically increase the width of the chair and can limit the occupant's access to the respective drive wheel. Limiting the occupant's ability to grasp and move the drive wheel impedes the occupant's freedom to move forward or backward and to steer and move about generally, particularly in confined spaces. Storage devices mounted wholly or partly at the front of the wheelchair or scooter likewise impede the occupant's freedom to enter and exit the wheelchair or scooter.

U.S. Pat. No. 4,580,803-Davis discloses a front basket, box or tray, which is movable between an access position in front of a wheelchair, and a stowed position alongside the wheelchair. The access position is comparable to that of the front basket of a bicycle. The wheelchair basket, tray or the like is mounted on horizontal tubes extending forward, substantially collinearly with the armrests of the wheelchair. One of the tubes is slidably retractable to engage at one of the armrests. The basket is rotatable manually around the tube at the other armrest whereby the basket can be lifted up and over the axis defined by the tube for stowage, to reside alongside the wheelchair at a level below the armrest. Of course the wheelchair occupant normally is required to lift the basket over the armrest and to lower it on the outside of the armrest.

U.S. Pat. No. 4,795,182-Dyess et al discloses a wheelchair with a similar front basket. In this case the basket is pivotally attached about a vertical axis at a forward corner of the wheelchair. Substantially less effort is required to move the basket clear of the wheelchair seat as compared to the above patent to Davis. However, in the stowed position the basket protrudes substantially beyond the armrest such that it is impractical to move the wheelchair about with the basket in any position other than over the occupant's lap.

U.S. Pat. No. 4,919,443-Kehler discloses a swing-out storage box for a wheelchair. The box is pivotally attached about a vertical axis at a lateral side of the seatback, i.e., at a rear corner of the wheelchair. In the stowed position the box is directly behind the wheelchair occupant. The box is manually movable around an axis at the side of the seatback from the rear stored position to an access position substantially over one of the armrests of the wheelchair.

Additional devices for storing personal items which are attachable to a wheelchair are known, for example as sold under the trademark ABLEWEAR TM by MADDACK, Inc , Pequannock, N.J. 07440-1993. The 1987 ABLEWEAR catalog discloses bags and pouches attachable to the back of a wheelchair seat, trays engageable to the armrests in front, and movable bins for magazines and the like, pivotable around the front vertical frame member. Other specific item holders are also included, such as holders for canes, books, cameras, mirrors, flashlights, etc. For the most part these items are rigidly clamped to a frame member of the chair, and include movable linkage mechanisms whereby the receptacle for the item can be position manually by the occupant, alone or with the help of an assistant.

The "HAVE-A-TRAY®" item, as illustrated on page 13 of the ABLEWEAR 1987 catalog and the subject of U.S. Pat. No. 4,289,156, provides a plastic compartment for storing and transporting personal items. The tray is swingable manually between positions forward or alongside the wheelchair. The tray cannot be placed in a completely unobtrusive position without completely removing it from the wheelchair frame.

Although these and other known devices include various storage bags and bins attachable to a wheelchair, in each case the occupant of the wheelchair is expected to manipulate portions of the devices manually in order to effect their function. In certain instances, such as those devices requiring the occupant to lift a relatively large basket over a pivot axis, the occupant may be unable to effectively manipulate the device. In those instances where minimal exertion is required to move a device between its respective stowed and accessible positions, the device obstructs some useful or functional aspect of the wheelchair when stowed, or when mounted so as to be unobstructive when stowed, is also substantially out of the range of the occupant's convenient grasp. There is a need for a mounting for a wheelchair or scooter storage bag, bin or similar device which is operable to move the device under motive power from an inaccessible position where no useful function of the wheelchair or scooter is impeded, e.g., a position fully behind the seat of the wheelchair or scooter, to a position alongside the wheelchair where it may be accessed conveniently by the wheelchair or scooter occupant.

SUMMARY OF THE INVENTION

It is a general object of the invention to provide a receptacle which is attachable to a personal transportation device such as a wheelchair or scooter for practical use by the wheelchair or scooter occupant in storing and accessing personal articles.

It is an object of the invention to provide an actuator for a storage bag attachment for a wheelchair or scooter, which is operable to pivot the storage bag from an out of the way, unobtrusive position, to a conveniently accessible position.

These and other objects are accomplished by a storage bag arrangement which is attachable to a personal transportation device for a handicapped person such as a wheelchair or scooter and arranged to pivot a storage receptacle from a stored position against the back of a personal transportation device backrest, to an accessible position adjacent a personal transportation device armrest. An L-shaped movable bar carries the bag or similar receptacle on a horizontal leg, and is pivotable on a hinge means clamped to a vertical member of the personal transportation device, i.e., wheelchair or scooter defining a vertical rotation axis. The pivoting is accomplished under electric motor power via a motor having a housing clamped, for example to a lower portion of the vertical frame member of the wheelchair or scooter. An armature of the motor is coupled to the vertical leg of the L-shaped bar supporting the storage bag on its horizontal leg. The motor is preferably reversible for powering the bag back into its stored position from its accessible position adjacent a wheelchair or scooter armrest, but also can be arranged to wind a spring in one direction and to release the bag for spring return. In the event of a spring, latch means are preferably provided to retain the bag in the accessible position when power is decoupled from the motor. Switch means, for example located on a wheelchair or scooter arm rest, control coupling of power to the driving motor, the power being provided by an on-board auxiliary battery mounted on the wheelchair frame. Alternately, if the wheelchair or scooter is electrically powered by a storage battery, generator or the like, power for the driving motor can be derived therefrom.

The movable storage bag is preferably a pouch-type soft bag having an open top, or a simple flap or zipper closure, button, VELCRO or similar closure for selectively accessing the interior of the bag.

The L-shaped pivoting bar is carried on a vertically oriented hinge attachable to the personal transportation device frame via a clamp or the like. The bar sections can be disposed at substantially a 90° angle relative to one another. The bag section of the bar is fixed at or near the top of the storage bag, preferably with the motor clamp and the hinge defining spaced mounting points along the frame member to which the device is mounted, e.g., a substantially vertical frame member along the seatback. Where the seatback frame member is not vertical, the clamps can be spaced from the motor axis and the hinge axis by different distances in order to arrange the rotation axis substantially at vertical. In this manner, the bag is pivotable from a position against the back of the seat of the personal transportation device to a position alongside the transportation device.

The bag or similar receptacle is mounted at sufficient height to clear any obstructions encountered between the stowed position and the access position as the device is rotated. One major obstruction is the drive wheel of the wheelchair or scooter. The bag or the like can have a radial cut-away at its lower edge adjacent the hinge axis of sufficient dimensions to enable the bag to pass over and around the drive wheel of the wheelchair or scooter without obstruction.

A number of variations and further embodiments are also possible and several examples are discussed in connection with particular embodiments as shown in the drawings and the following detailed description.

BRIEF DESCRIPTION OF THE PREFERRED DRAWINGS

FIG. 5. is a perspective view of an alternate embodiment of the invention.

FIG. 6 is an elevation view of a clamp/baseplate used on the alternate embodiment.

FIG. 7 is an elevation view of the alternate embodiment having a storage bag attached.

FIG. 8 is an end view of the storage bag.

FIG. 9 is a perspective view of an alternate embodiment of the invention mounted on a wheelchair.

FIG. 10 is a perspective view as shown in FIG. 9 showing the slide extension capabilities.

DETAILED DESCRIPTION OF THE PREFERRED EMBODIMENTS

Figure 1:
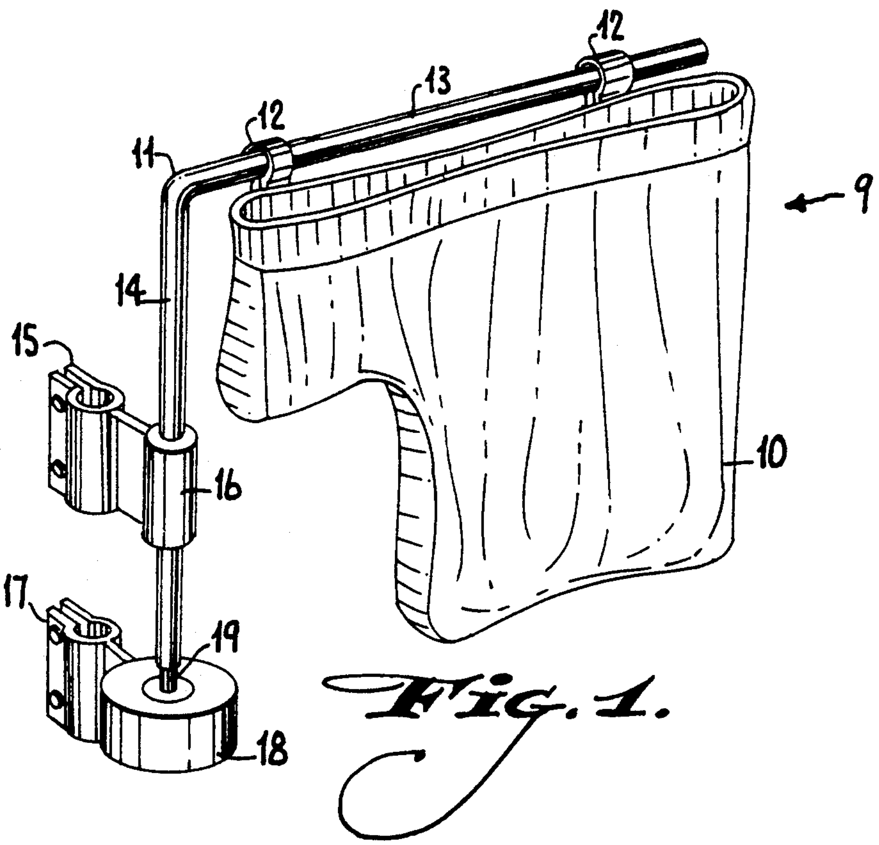
FIG. 1 is a perspective view of the movable bag attachable to a wheelchair of the invention.

In FIG. 1, wheelchair or scooter bag 10 is attached to the horizontal leg 13 of L-shaped support bar 11 by loops 12. Bag 10 can be open at its top as shown, or if desirable the bag 10 can be selectively closable, for instance, by buttons, snaps, VECRO or a zipper. L-shaped support bar 11 has bag leg 13 and an attachment leg or shaft 14, preferably integral with one another or rigidly attached.

The support bar 11 is pivotally mounted via its attachment leg 14 to the frame of the wheelchair or scooter. Clamp 15 is rigidly attachable to a wheelchair or scooter frame member and pivotally carries attachment shaft 14 in clamp bearing 16. Clamp bearing 16 retains shaft 14 relative to the frame member engaged by clamp 15, supporting shaft 14 while allowing rotation of attachment shaft 14 around the axis of the clamp bearing.

Shaft 14 is also couple at its lower end to the motor shaft 19 of motor 18. The housing of motor 18 is rigidly fixed to the wheelchair frame via motor clamps 17. Motor shaft 19 can terminate in a non-round engagement fitting which fits a corresponding receptacle coupled to the shaft 14 of L-shaped support bar 11, for instance, a square, hexagonal, or octagonal fitting which allows the motor shaft 19 to engage shaft 14 for driving rotation. In this manner also, support bar 11 is removable from motor 18 as necessary for repair, replacement or the like. Alternately, motor shaft 19 can be fixed permanently to attachment shaft 14, for example by welding.

Figure 2:
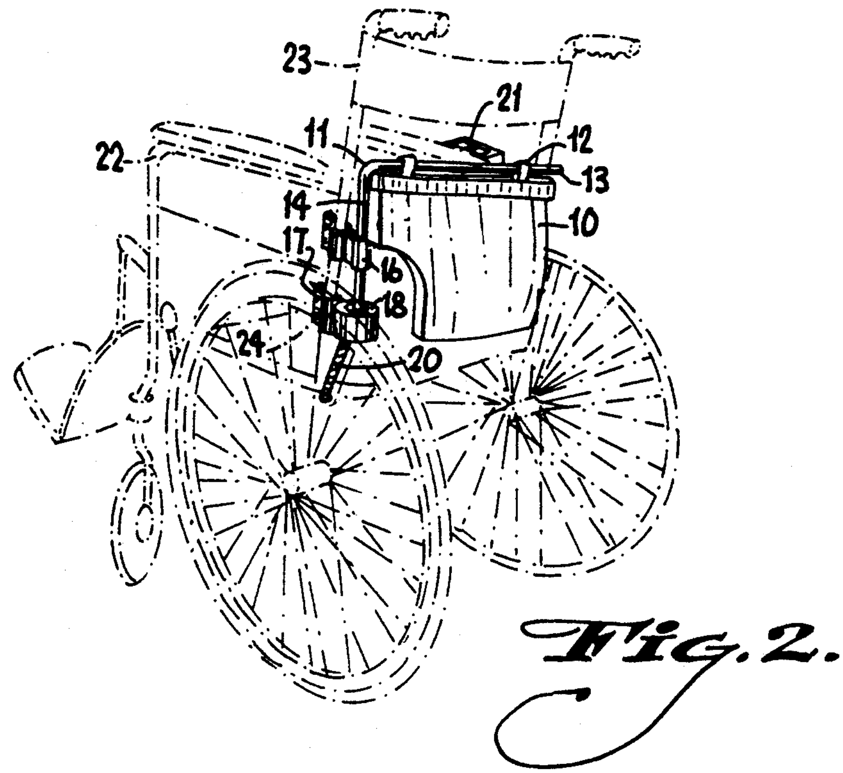
FIG. 2 is a perspective view of the bag attached to the wheelchair frame and positioned in its stored position ag inst the back of the wheelchair seat.

Bag assembly 9 is shown mounted to wheelchair 22 in FIG. 2. Clamp 15 and motor clamp 17 are attachable to chair back support post 23. The chair back support post 23 may not be precisely vertical, which would tend to urge the bag 10 to rotate to its lowest elevation in the plane of tilt of post 23. This can provide a gravity return for the bag 10 if the post 23 is tilted laterally inwardly, however typically the post 23 tilts to the rear. The distance between the respective hinge clamp 15 or motor Clamp 17 and the corresponding axis of the hinge 16 or motor shaft 19 can be different, so as to maintain a vertical orientation of the support shaft 14 of L-shaped bar 11. Alternatively, or in addition, if a gravity return is desired, the clamps and the respective axes can be arranged such that the axis of rotation of bar 11 tilts toward the stowed position of bag 10.

Motor 18 receives electrical energy from auxiliary battery 24. Auxiliary battery 24 is preferably removable and rechargeable, and may be arranged to power additional accessories associated with the wheelchair. If wheelchair 22 has a primary electrical power system, the primary system can drive motor 19 and the auxiliary battery 24 may be eliminated. Motor 18 is coupled to the power source (e.g., battery 24) through switch means 21. The switch means preferably includes a manual actuation mechanism such as a toggle or pushbutton mounted in a readily accessible position, such as on or under an armrest of wheelchair 22. Switch 21 is advantageously located on wheelchair 22 opposite the arm adjacent bag 10 when deployed. In this manner, operation of switch 21 will not be encumbered by bag 10 or bag shaft 13 when moved to the access position. Switch 21 is electrically connected to motor 18 through wire 20, which is routed around the back and/or under the seat portion of the wheelchair.

Figure 3:
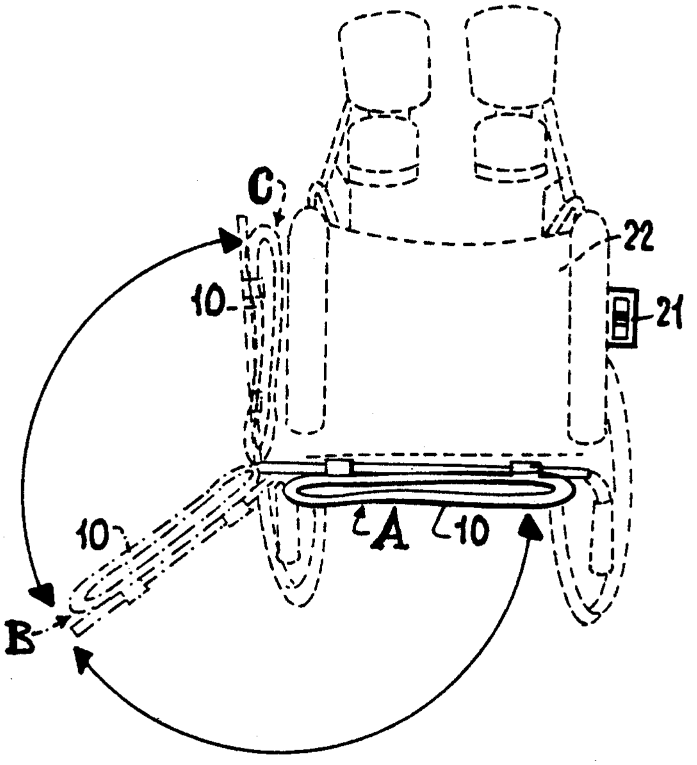
FIG. 3 is a top view of the bag attached to a wheelchair showing the radius of movement of the bag from its stored position to its accessible position.

As illustrated in FIG. 3, actuation of switch 21 energizes motor 18 to rotate bag 10 around the axis defined by bearing 16 and motor shaft 19, from behind the seat back of wheelchair 22 to a position alongside the arm rest of wheelchair 22. The cut-away section of bag 10 at the corner adjacent the hinging axis enables bag 10 to pass over obstructions such as the rear wheel of wheelchair 22 along its circular path of deployment. In the embodiment shown, bag 10 is movable around an arc of about 270° from the stowed position adjacent the wheelchair seat back to the access position adjacent the wheelchair arm rest.

The motor 18 can be provided with a sufficiently high braking torque to hold motor shaft 19 in position at the access position, thereby holding bag 10 in place. Alternatively, a latch mechanism (not shown) can engage the bag or the bag shaft to hold the bag in the access position when required. The storage position as of bag 10 is indicated in FIG. 3 by letter A, and the accessible position is indicated by letter C.

Motor 18 can be reversible to move bag 10 positively between position C and position A in either direction. When using a reversible motor 18 switch 21 can be, for instance, a three position switch having a position to couple power for clockwise rotation of motor shaft 19, a reversing position to couple power at the opposite polarity for counterclockwise rotation of motor shaft 19, and an off or decoupled position.

Figure 4:
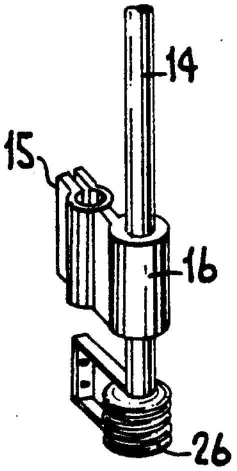
FIG. 4 is a perspective view of a return spring mounted on the shaft of the bag support.

If motor 18 is unidirectional, for instance, to drive bag 10 from position A to position C only, means are needed for returning bag 10 to position A. As discussed above, a return mechanism can be provided by arranging a tilt in the rotation axis whereby the storage position defines the lowest elevation of the bag 10 and support bar 13. Another example of a return means is shown in FIG. 4. Coil spring 26 encircles the bottom of attachment shaft 14 and is engaged at its opposite ends to shaft 14 and to a base member fixed relative to the wheelchair frame, preferably under spring tension biasing rotation of attachment shaft 14 towards position A in FIG. 3. The wheelchair occupant can switch motor 18 on to drive wheelchair bag 10 from position A to position C, thereby winding the spring more tightly. The bag 10 may then be accessed by the wheelchair occupant and held in position by a latch or via the force of motor 18 until deenergized. After retrieving an article from bag 10 or placing an article into bag 10 the occupant simply releases grasp of bag 10, whereupon coil spring 26 returns bag 10 to storage position A shown in FIG. 3.

A preferred embodiment of the device is depicted in FIG. 5. Attachment plate 32 has horizontal leg 33 and vertical leg 34. Upper support bracket 35 is affixed on an upper portion of vertical leg 34. Lower support bracket 36 is affixed at a lower portion of support bracket 32 and opposes uppe support bracket 35. Motor 37 is attached to vertical leg 34 between upper support bracket 35 and lower support bracket 36. Drive shaft 38 of motor 37 is non-rotatively coupled to driven section 39 of support frame 31. Journalled section 40 of support frame 31 is rotatively coupled to lower support bracket 36. Horizontal leg 33 is attached to clamp 41, which in turn clamps on post 23 for attachment of movable storage device 42 to a personal transportation device for a handicapped person.

It is well known that post 23 for a back rest of a personal transportation device is generally disposed at an angle other than vertical. Usually, post 23 tilts slightly backward away from a wheelchair or scooter occupant. Since movable storage device 42 is affixed to post 23, it is preferable to provide a cantable connection for movable storage device 42 to post 23. The cantable connection is provided by slotted screw hole 43 on attachment plate 32 as shown clearly in FIG. 6. By loosening a screw through slotted screw hole 43, attachment plate 32 can be pivoted about a screw in pivot screw hole 44 with respect to clamp 41 to maintain horizontal leg 33 in a position parallel to the ground regardless of the angle of post 23. Once horizontal leg 33 is suitably positioned, the screw can be tightened in slotted screw hole 43 to secure attachment plate 32 in position.

FIGS. 7 and 8 show movable storage device 42 with bag 45 in place. Bag 45 can be a dual compartment bag having compartments 46 and 47 connected by draping strip 48. Draping strip 48 is placed over bag section 50 of support frame 3I whereby compartments 46 and 47 hang downward from support frame 31. It is preferable to include a fastener, such as strap 49 as shown in FIG. 7, for holding bag 45 in place on bag section 50.

In another embodiment, slide mechanism 51, such as the type used in filing cabinets and drawers, is mounted on bag section 50 of support frame 31. Slide mechansim 51 allows the wheelchair or scooter occupant to slide bag 45 to a more forward position alongside the wheelchair to, for example, allow an occupant easier access to bag 45.

While specific embodiments of the invention have been described in detail, it will be appreciated that those skilled in the art will now be aware of various modifications and alternatives to the foregoing preferred embodiments in light of the overall teachings of this disclosure. For example, bag 10 is shown attached to bag shaft 13 using loops 12. It is within the scope of the invention to attach bag 10 using different means such as riveting or otherwise more directly attaching bag 10 to bag shaft 13 etc. Furthermore, the coil spring shown for returning bag is from its accessible position (C) to its storage position (A) is one example of various possible spring and gravity return arrangements. Different springs, spring locations and return means may be substituted for those shown. Accordingly, the particular arrangements disclosed are meant to be illustrative only and not limiting as to the scope of the invention which is to be given the full breadth of the appended claims and any and all equivalent thereof.

What is claimed is:

1. A movable storage device for use on a personal transportation device for a handicapped person having at least one rear wheel, a side, a wheelchair seat having a bottom and a backrest, and at least one frame member for the seat, comprising:

storage means for receiving articles;

a support bar having a bag section and a pivot section, said bag section supporting said storage means;

hinge means fixedly attachable to the at least one frame member of the personal transportation device, said pivot section of said support bar rotatively cooperating with said hinge means, for rotation of said storage means from a position disposed behind the backrest to alongside the personal transportation device; and, drive means for rotating the pivot section and the bag section of the movable support in at least one direction for moving the bag section between the position behind the personal transportation device and the position alongside the personal transportation device.

2. The movable storage device according to claim 1, wherein said drive means is reversible for driving said bag section in both directions between the position behind the personal transportation device and the position alongside the personal transportation device.

3. The movable storage bag according to claim 2, wherein said drive means comprises a reversible electric motor.

4. The movable storage device accordinq to claim 1, wherein said drive means is a unidirectional electric motor for driving said bag section in said at least one direction, and further comprising return means operable to return said bag section in an opposite direction.

5. The movable storage device according to claim 1, wherein said support bar comprises an essentially L-shaped bar, the bag section being defined by a substantially horizontal section of the L-shaped bar and the pivot section being defined by a substantially vertical section of the L-shaped bar.

6. The movable storage device according to claim 1, wherein said storage means comprises a bag having an access opening substantially at a top thereof.

7. The movable storage device according to claim 6, further comprising a closure for the access opening of said bag, wherein said closure comprises at least one of a zipper, button, snap or Velcro closure

8. The movable storage device according to claim 6, wherein said bag has a cut-out adjacent the pivot section for enabling said bag to pass over at least one obstruction when driven between said position behind the personal transportation device and the position alongside the personal transportation device.

9. The movable storage deVice according to claim 8, wherein the cutout is dimensioned to allow the bag to pass over the at least one rear wheel of the personal transportation device.

10. The movable storage device according to claim 1, wherein the drive means comprises an electric motor, and further comprising switch means for selectively coupling power to said electric motor.

11. The movable storage device according to claim 10, further comprising a battery for supplying electric power to the electric motor.

12. The movable storage device according to claim 10, wherein the personal transportation device has a primary locomotion motor and a battery for electrically powered locomotion of the personal transportation device said battery supplying electrical energy to said electric motor.

13. The movable storage device according to claim 3 further comprising a three position switch operable to switch power to the motor for moving the bag section between the position behind the personal transportation device and the position alongside the personal transportation device for moving the bag section in an opposite direction, and for decoupling power from the motor.

14. The movable storage device according to claim 4, further comprising releasable catch means mounted on at least one of said support bar or said storage means, and mating catch means on said personal transportation device, the catch means and the mating catch means being engageable for securing said bag section alongside the personal transportation device when said bag section is driven alongside the personal transportation device.

15. The movable storage device according to claim 1, further comprising means for returning the bag section in a direction opposite said at least one direction wherein the means for returning the bag section comprises a spring biasing the bag section to the position behind the backrest.

16. The movable storage device according to claim 1 wherein the drive means has a drive shaft for engaging said support bar at an end of said pivot section, said drive shaft having a polygonal cross section for mating with a similarly polygonal shaped recess in the pivot section.

17. The movable storage device according to claim 1 further comprising slide means mounted on said bag section of said support bar, said storage means being supported on said slide means whereby said storage means may be advanced forward alongside said personal transportation device after said bag section has been moved to the position alongside the personal transportation device.

18. A movable storage device for use on a personal transportation device for a handicapped person having at least one rear wheel, a side, a seat having a bottom and a backrest, and at least one frame member for the seat, comprising:

storage means for receiving articles;

a support frame having a bag section, a driven section and a journalled section, said bag section supporting said storage means;

attachment means having a substantially horizontal and a substantially vertical leg;

opposing support brackets each having at least one aperture therein mounted on said substantially vertical leg;

an electric motor mounted between said opposing support brackets, said driven section coupled to said motor through one of said support brackets, said journalled section rotatively journalling within the aperture of the other of said opposing support bracket;

clamp means for clamping the substantially horizontal leg of said attachment means to the at least one frame member whereby said motor is operable to rotate said support frame between positions behind the backrest of the personal transportation device to a position alongside the personal transportation device.

19. The movable device of claim 18 wherein said attachment means is cantable with respect to the clamp means for maintaining the substantially horizontal section of said attachment means essentially parallel to the ground regardless of the angle of the at least one frame member.

20. The movable storage device of claim 18 wherein said electric motor is reversible.

21. The movable storage device of claim 18 wherein said storage means comprises an at least two compartment bag having opposing bag openings separated by a draping section, said bag being draped over said bag section of said support frame, said bag section supporting said draping section whereby said bag openings face upward for access by a personal transportation device occupant.

22. The movable storage device of claim 18 further comprising switch means for controlling one of the direction of rotation or stoppage of said motor 23. The movable storage device of claim 18 further comprising a battery for supplying electrical energy to said motor.

24. The movable storage device of claim 18 further comprising operator releasable catch means mounted on at least one of said storage means or said support frame and opposing mating catch means on said personal transportation device, the catch means and the opposing, mating catch means being engageable for securing the bag section alongside the personal transportation when said support frame is rotated to the position alongside the personal transportation device.

25. The movable storage device of claim 18 wherein the motor has a drive shaft for engaging said driven section, said drive shaft having a polygonal cross section for mating with a similarly shaped polygonal recess in said driven section.

26. The device of claim 18 further comprising slide means mounted on said bag section of said support frame, said storage means being supported on said slide means whereby said storage means are advancable forward alongside said personal transportation device after rotation of the support frame to a position alongside the personal transportation device.

* * * * *

UNITED STATES PATENT AND TRADEMARK OFFICE

CERTIFICATE OF CORRECTION

PATENT NO. : 5,180,181

DATED : January 19, 1993

INVENTOR(S) : Jorge Letechipia

It is certified that error appears in the above-indentified patent and that said Letters Patent is hereby corrected as shown below:

On title page, item

[75] Assignee:

"The Good Shepherd Rehabilitation Hospital" should read --The Good Shepherd Rehabilitation Hospital, Inc.--.

Signed and Sealed this

Twenty-sixth Day of July, 1994

Attest:

BRUCE LEHMAN

*Attesting Officer*

*Commissioner of Patents and Trademarks*